US009426950B2

(12) United States Patent
Gidekel (10) Patent No.: US 9,426,950 B2
(45) Date of Patent: Aug. 30, 2016

(54) **PRODUCTION OF *DESCHAMPSIA ANTARTICA* IN BIOREACTORS**

(71) Applicant: Manuel Gidekel, Santiago (CL)

(72) Inventor: Manuel Gidekel, Santiago (CL)

(73) Assignee: Uxmal S.A., Santiago (CL)

( * ) Notice: Subject to any disclaimer, the term of this patent is extended or adjusted under 35 U.S.C. 154(b) by 249 days.

(21) Appl. No.: 13/694,381

(22) Filed: Nov. 27, 2012

(65) Prior Publication Data
US 2014/0144080 A1 May 29, 2014

(51) Int. Cl.
*A01G 9/10* (2006.01)
*C05D 9/00* (2006.01)
*C09K 17/14* (2006.01)
*A01G 31/06* (2006.01)

(52) U.S. Cl.
CPC .................................. *A01G 31/06* (2013.01)

(58) Field of Classification Search
USPC ...................................................... 47/58.1 SC
See application file for complete search history.

(56) References Cited

U.S. PATENT DOCUMENTS

| | | | | |
|---|---|---|---|---|
| 7,485,445 | B2 * | 2/2009 | Gidekel et al. | 435/198 |
| 7,622,109 | B2 * | 11/2009 | Gidekel et al. | 424/94.6 |
| 8,415,271 | B2 * | 4/2013 | Gidekel et al. | 504/101 |
| 2008/0253977 | A1 * | 10/2008 | Gidekel et al. | 424/59 |
| 2009/0107914 | A1 * | 4/2009 | Gidekel et al. | 210/632 |
| 2010/0234222 | A1 * | 9/2010 | Gidekel et al. | 504/101 |
| 2011/0177178 | A1 * | 7/2011 | Gidekel et al. | 424/750 |

* cited by examiner

*Primary Examiner* — Monica Williams
(74) *Attorney, Agent, or Firm* — John Dodds (57) ABSTRACT

This invention discloses a process for the propagation and survival of *Deschampsia antarctica* suitable for industrial scale production. In particular, the process defines selected bioreactor conditions whereby morphologically high quality plants are obtained at high rates. This invention further discloses a bioreactor design which includes a design for automated temporary immersion of explants in a culture medium.

6 Claims, 8 Drawing Sheets

PRODUCTION OF *DESCHAMPSIA ANTARTICA* IN BIOREACTORS

FIELD OF THE INVENTION

This invention discloses a process for the propagation and survival of *Deschampsia antarctica* suitable for industrial scale production. In particular, the process defines selected bioreactor conditions whereby morphologically high quality plants are obtained at high rates. This invention further discloses a bioreactor designed for automated temporary immersion of explants in a culture medium.

BACKGROUND OF THE INVENTION

The continent of Antarctica is considered one of the world's most primitive ecosystems, with extreme environmental conditions. It is covered year-round by ice and snow, so plants grow on only 2% of the land (Alberdi et al., 2002). *Deschampsia antarctica* Desv. is a vascular angiosperm from the Poaceae family that has naturally colonized maritime Antarctica (Lewis Smith, 2003). The species is physiologically and biochemically adapted to the action of different abiotic factors such as high and low radiation, low precipitation, drought, flooding, salinity, and extremely low temperatures that sometimes come with frosts, ice, and snow (Alberdi et al., 2002; Barcikowski A at al., 1999; Bravo et al., 2001; Bravo and Griffith, 2005; Bystrzejewska, 2001; Day et al., 2001; Lewis Smith, 2003; Zuñiga et al., 1996).

*D. antarctica* can usually be found on the South Orkney Islands and in maritime Antarctica south of 68° S latitude, without extending onto the continent of Antarctica itself (Alberdi et al., 2002). Its growth period starts in November (springtime) and spreads through seed germination or through tillers sprouting from previous years' plants (Corte, 1961; Holderegger et al., 2003). The plant's sexual reproduction is scarce due to the fact that the climatic conditions limit the seeds' flowering and maturing, and it is unable to complete its reproductive cycle with gametes (Ruhland and Day, 2001). However, it is considered that *D. antarctica* colonizes new areas on the continent of Antarctica primarily through plant dispersal.

Propagation using the immersion systems technique (IST) in bioreactors is a technology that consists of immersing plant tissue in the culture medium for a period of time with a certain frequency (Etienne and Berthouly, 2002).

The behavior of each species' tissue in bioreactors must be studied in depth, as well as their behavior in connection with the frequencies and times of immersion, the makeup of the culture media, the variations in the quantity of oxygen available in the liquid medium, and the lengths of time the tissue remains inside the bioreactor. The information obtained is crucial to obtaining a morphologically high quality plant that guarantees that the technology can be used on an industrial scale. Tisserat and Vandercook (1986) believe it is possible to obtain and maintain high rates of morphophysiological growth and development of tissue if nutrients in the culture medium are constantly adjusted to meet the tissue's needs, which allows the tissue to remain inside the same reactor during prolonged periods of time.

BRIEF DESCRIPTION OF THE INVENTION

This invention discloses a process for the propagation and survival of *D. antarctica* suitable for industrial scale production. In particular, the process defines selected bioreactor conditions whereby morphologically high quality plants are obtained at high rates.

The present invention provides in one embodiment a process for producing *D. antarctica* explants at a high survival rate comprising the steps of
  (a) preparing explants in a suitable nutritive growth medium,
  (b) immersing the explants in a liquid culture medium at a specified immersion frequency,
  (c) aerating the explants after immersion for a specified period of time, and,
  (d) repeating steps (b) and (c) to achieve a desired level of production.

In another embodiment of the present invention, explants are periodically immersed in a nutritive media with selected frequencies and times of immersion. In particular, the immersion frequency varies from once per day to four times per day with an immersion rest time of 60 seconds. In a preferred embodiment, the frequency of immersion is two times per day resulting in a survival rate of greater than 80%.

In one embodiment of the present invention, that nutritive media is comprised of selected inorganic salt solutions, supplemented with Sepharose at a concentration of 30 g per liter.

In another embodiment, the nutritive media contains an osmoregulating agents consisting of mannitol at a concentration of 10 and 20 g per liter, glucose at 5 and 20 g per liter, polyethylene glycol at 5 and 10 g per liter and sodium chloride at 5, 10 and 20 g per liter; preferably, the osmoregulating agent is glucose at 5 g per liter, mannitol at 5 g per liter and polyethylene glycol at five and 20 g earlier; most preferably, the osmoregulating was glucose at 5 g per liter.

In another embodiment the growth medium is a semisolid or a solid growth medium.

In another embodiment the liquid culture medium is supplemented with growth regulators comprising BAP and AIB.

In another embodiment the present invention provides a temporary immersion bioreactor suitable for large-scale propagation of *D. antarctica* comprising
  a series of adjacent containers comprising a first container containing a liquid culture medium and a second container containing *D. antarctica* explant in a growth medium said first and second containers in alternating arrangement,
  a source of pressurized air connected to and in communication with said containers having sufficient pressure to forcefully direct liquid medium to flow into and out of adjacent containers, and
  a valve and timer to control direction of liquid medium flow from the first container into the second container, to remain in the second container for a predetermined time period and to force said liquid medium back into the first container.

DETAILED DESCRIPTION OF THE INVENTION

Plant Material

The *Deschampsia antarctica* plants were gathered on the Collins Glacier peninsula (62°22'S; 59°43'W) on the Antarctic territory. Before being placed in vitro, the plant material was disinfected with the fungicides Benomilo and Captan (1 $gL^{-1}$) for 20 minutes, then with 40% ethanol for 20 seconds, and a 10% sodium hypochlorite solution plus Tween 20 for 12 minutes. The explants were then reproduced in a semisolid nutritive medium based on the inorganic salts proposed by (Murashige, 1973) (MS), supplemented with 1.0 mgL-1 BAP (N6 Benzylaminopurine), 30 $gL^{-1}$ saccharose, and 3 $gL^{-1}$ Gelzan™ as a gelling agent. The pH of the culture media was adjusted to 5.7, and sterilization was done at a pressure of 1.2 kgf·$cm^{-2}$ for 20 minutes.

Design of Bioreactors

A bioreactor named Biorack was designed to take *D. antarctica* to a large scale. The system was built on a metal frame structure (A36 steel) consisting of a four-level storage cart. It is 1.40 m long and 1.76 m high, with 0.6 m of space between each level. The base of the cart has 4 wheels (50 mm) that spin to make it easy to roll the Biorack from one area to another, and an individual brake to set each one. The metal frames are attached to each other with metric screws (M8×1.25×12). The base of each level is made up of a grate (10 cm between lines) on which five pairs of 3.9-liter crystal jars with metal lids are mounted. The temporary immersion unit consists of two jars; one is used as a reservoir of the nutritive medium, and the other one is for storing the explants. The jars are connected to each other with a flexible silicone hose (8 mm in diameter and 15 cm long) that is inserted through the lid of each recipient with a connector and reaches the bottom of the jar to allow for exchanging the culture medium. Each crystal jar has a flexible 5 mm polyurethane tube for compressed air that pumps the nutritive medium from one side to the other, and a valve that guarantees sterilization during disconnection from the Biorack.

Each Biorack level has two lines of flexible polyurethane tube (1 cm in diameter) that are attached to each other with SMC rapid fittings and HyLock fittings. Each line delivers compressed air to the jars. The pressure at which the compressed air goes into the jars is controlled by an SMC ARP20-02BE air pressure regulator at 0.22 [Mpa] so that the speed with which the air moves from one recipient to another can be regulated. The time and frequency of immersion are controlled by a pair of VS3135-044T valves activated with a 220 VAC signal from a Delta PLC with an HMI interface through a touch screen; it is programmed through software. When either valves opens, the air, and therefore the culture medium, circulates from one recipient to the other.

The main air line consists of copper tubes (2 cm in diameter). They have an SMC AFF8B-04D-T filter that removes impurities such as oil, water, and other extraneous particles, and an SMC AMF350 odor filter.

Figure 1:
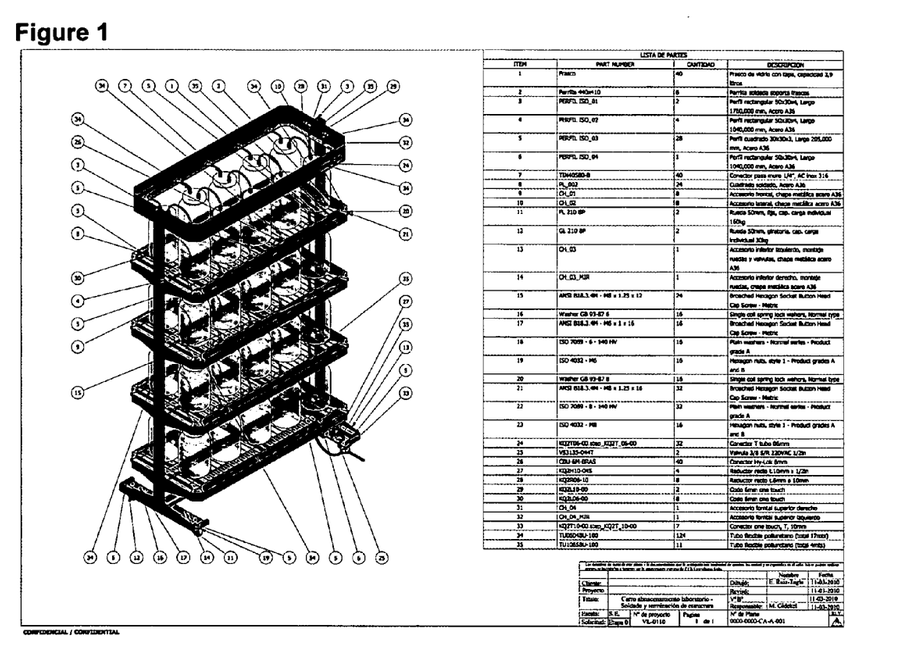
FIG. 1.—Design and construction materials in the bioreactor used to produce *Deschampsia antarctica* plants.

The working air pressure is provided by a 4 kW WUTH compressor with a capacity of 460 liters/min and 10 bars of output (1[MPa]) which, together with a 200-liter SiCC storage tank, allows several Biorack to work simultaneously. The system also has an SMC IDFA6E-23 refrigeration air dryer that keeps the dew point between entire 3 and 10 [° C.]. FIG. 1 shows the temporary immersion system designed to micropropagate *Deschampsia antarctica* plants. The parts described in FIG. 1 are listed in Table 2.

TABLE 2

| Parts list in FIG. 1 | | | |
|---|---|---|---|
| ITEM | PART NUMBER | QTY | DESCRIPTION |
| 1 | Jar | 40 | Glass jar with lid, 3.9 L capacity |
| 2 | Grill 440 × 410 | 8 | Supports welded grill bottles |
| 3 | ISO PROFILE_01 | 2 | 50 × 30 × 4 rectangular profile, length 1760.000 mm, Steel A36 |
| 4 | ISO PROFILE_02 | 4 | 50 × 30 × 4 rectangular profile, length 1040.000 mm, Steel A36 |
| 5 | ISO PROFILE_03 | 28 | 30 × 30 × 3 rectangular profile, length 205.000 mm, Steel A36 |
| 6 | ISO PROFILE_04 | 1 | 50 × 30 × 4 rectangular profile, length 1040.000 mm, Steel A36 |
| 7 | TIN40580-B | 40 | Wall connector passes ¼ "316 stainless steel |
| 8 | PL_002 | 24 | Square welded, steel A36 |
| 9 | CH_01 | 8 | Frontal accessory, sheet metal Steel A36 |
| 10 | CH_02 | 8 | Lateral accessory, sheet metal Steel A36 |
| 11 | FL 210 BP | 2 | 50 mm wheels, fixed, individual load cap. 160 kg |
| 12 | GL 210 BP | 2 | 50 mm wheel, swivel, individual. load cap 30 kg |

TABLE 2-continued

Parts list in FIG. 1

| ITEM | PART NUMBER | QTY | DESCRIPTION |
|---|---|---|---|
| 13 | CH_03 | 1 | Left lower accessory, wheels and valve assembly, metal A36 sheet |
| 14 | CH_03_MIR | 1 | Right lower accessory, wheel assembly, metal A36 sheet |
| 15 | ANSI B18.3.4M - M8 × 1.25 × 12 | 24 | Broached Hexagon Socket Button Head Cap Screw - Metric |
| 16 | Washer GB 93-87 6 | 16 | Single coil spring lock wahers, Normal type |
| 17 | ANSI B18.3.4M - M6 × 1 × 16 | 16 | Broached Hexagon Socket Button Head Cap Screw - Metric |
| 18 | ISO 7089 - 6 - 140 HV | 16 | Plain washers - Normal series - Product grade A |
| 19 | ISO 4032 - M6 | 16 | Hexagon nuts, style 1 - Product grades A and B |
| 20 | Washer GB 93-87 8 | 16 | Single coil spring lock wahers, Normal type |
| 21 | ANSI B18.3.4M - M × 1.25 × 16 | 32 | Broached Hexagon Socket Button Head Cap Screw - Metric |
| 22 | ISO 7089 - 8 - 140 HV | 32 | Plain washers - Normal series - Product grade A |
| 23 | ISO 4032 - M8 | 16 | Hexagon nuts, style 1 - Product grades A and B |
| 24 | KQ2T06-00.step_KQ2T_06-00 | 32 | T connector tube 06 mm |
| 25 | VS3135-044T | 2 | ⅜ S/R 220 VAC ½ in Valve |
| 26 | CBU-6M-BRAS | 40 | Hy-LK 6 mm connector |
| 27 | KQ2H10-04S | 4 | 10 mm × ½ in Straight Reducer |
| 28 | KQ2R06-10 | 8 | 6 mm 10 mm Straight Reducer |
| 29 | KQ2L10-00 | 2 | 6 mm one touch Elbow |
| 30 | KQ2L06-00 | 8 | 6 mm one touch Elbow |
| 31 | CH_04 | 1 | Right frontal upper accessory |
| 32 | CH_04_MIR | 1 | Left frontal upper accessory |
| 33 | KQ2T10-00.step_KQ2T_10-00 | 7 | 10 mm one touch connector |
| 34 | TU0604BU-100 | 124 | Polyurethane Hose (total 17 m) |
| 35 | TU1065BU-100 | 11 | Polyurethane Hose (total 4 m) |

How it Works

Surrounding air is captured by the Wuch compressor, which then takes it through the main line to the first air filter to remove such impurities as oils and other large-size particles. Next, it is taken to a storage tank with water purging at the base to eliminate condensation. It comes out of the tank, goes through an air dryer and through a second filter to remove odors. Finally, it is taken through the main line to each Biorack.

The entire process is regulated with timers, which are programmed for a *Deschampsia antarctica* plant reproduction cycle. During each cycle, one of the timers is programmed to open a solenoid valve (S1) that allows air to enter only one Biorack line. It works for 300 seconds, taking the liquid into the recipient containing the explants. Immediately afterwards, it goes into an immersion rest time of 60 seconds. When that time is up, the other timer opens the other solenoid valve (S2), which allows air into the recipient through the other Biorack line for 300 seconds, returning the liquid to the original recipient.

In the first event, when the air goes in it puts pressure into the inside of the recipient so that the liquid passes from one recipient to the other. The air goes in through an S1 valve, which is opened by a timer (Timer T1), while another timer (Timer T2) keeps valve S2 closed. In the second event, when the air goes into the second recipient, the pressure causes the liquid to return to the first one (the original recipient) through valve S2, which is opened by timer T2, ending the cycle. Once the functioning time has finished, S2 closes.

This process can be repeated as many times as required during the day using the immersion time and frequency needed, depending on the goal of the project and the culture used.

Culture Conditions

The *Deschampsia antarctica* plants were reproduced in bioreactors with a liquid culture medium. The nutritive growth conditions were formulated using the inorganic salts proposed by (Murashige, 1973) (MS), supplemented with saccharose 30 $gL^{-1}$. In order to determine the conditions needed to obtain high growth and morphophysiological development rates for the tissues, an evaluation was done of the immersion frequency conditions and the addition of osmotic and growth regulating agents.

The culture media's pH was adjusted to 5.7, and sterilization was done at a pressure of 1.2 $kgf \cdot cm^{-2}$ for 20 minutes.

All of the cultures were kept in growth chambers with a photoperiod of 16/8 hours of light/dark, with an active photosynthetic photon flow density that varied from 1500 to 2000 $\mu mol \, m^{-2} \, s^{-1}$ and a culture temperature of 22±2.0° C.

The Effect of Immersion Frequency on *D. antarctica*'s Biomass Production

Three immersion frequencies were studied (6, 12, and 24 hours) to determine the sensitivity of the *D. antarctica* tissue to the nutritive medium.

Figure 2:
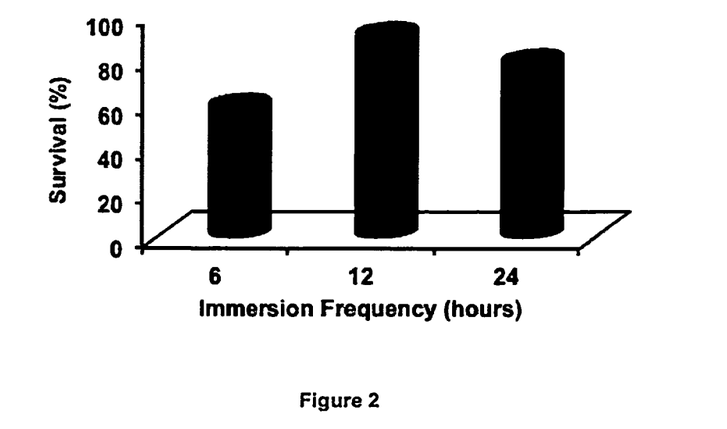
FIG. 2.—*D. antarctica* survival rate by frequency of tissue immersion, cultivated in bioreactors. The frequency is the number of times the explants were immersed each day.

FIG. 2 shows that the immersion time intervals had a significant impact on the survival percentage of the *D. antarctica* explants in the bioreactors. The highest survival rate (over 80%) was obtained with a frequency of two immersions per day (shoots and best length development). The survival rate of the explants declined with an immersion frequency of four times per day, with necrotic tissue found, particularly at the base of the plants, while explants cultured once a day reached survival rates of 80% but the leaves showed indications of cells dying due to dryness.

Immersion time intervals play a decisive role in the survival and reproduction coefficients. This coincides with (Etienne and Berthouly, 2002), who stated that the duration or frequency of immersion is the most important parameter of the system's efficiency, and that immersion also improves the quality of the plant material, increases the vigor of the shoot or the development of the plant, and reduces hyperhydricity (Ziv, 2005). According to other authors (Debergh and Maene, 1981; Roberts and Matthews, 1995), this result is based on the fact that in these cultures, the entire surface of the explant comes in direct contact with the liquid culture medium, which allows for more effective capturing of nutrients and the release of toxic metabolites that could accumulate in the area of the tissue since it spreads more efficiently than the semisolid culture medium.

The Effect of the Medium's Osmotic Regulation of *D. antarctica*'s Morphogenic Development and Biomass Production The regulation of the culture medium's hydric potential determines the quality of the morphogenic response of the plants being cultivated in vitro, especially in systems using liquid culture media (Hua et at, 2010; Stanly et al., 2010). The experiment consisted of evaluating the effect of osmoregulating agents at different concentrations [mannitol (10 and 20 gL-1), glucose (5 and 20 gL-1), polyethylene glycol (5 and 10 $gL^{-1}$), and NaCl (5, 10, and 20 gL-1)] on the morphogenic response and biomass production of *D. antarctica*.

Preparation of Explants and Cultivation Conditions

In each bioreactor, 100 plants from the semisolid culture (SSS) that were more than 2 cm tall, with well-developed, expanded leaves, were inoculated in triplicate. The dead leaves and oxidized tissue that grows around the crown of the plants were removed. The bioreactors' initial volume was adjusted to 1000 ml per cultivation jar. A 12-hour immersion frequency was used, with an immersion time of 300 seconds and an aeration time of 60 minutes.

The average initial weight of the explants in each treatment was taken. The repetitions were distributed randomly in the culture trays.

The effect of the osmoregulators was evaluated with the following variables: Increase in fresh weight (FW) per treatment, increase in fresh weight per explant, multiplication rate, explant survival rate, and degree of oxidation.

To calculate survival, live explants were assigned a value of 1, while dead explants were assigned a value of 0. The data was entered into a double-entry matrix where the osmoregulator-type factor is compared to the survival variable. A scale of the explants' damage from phenolization was developed to calculate the degree of oxidation, and is described in Table 1.

TABLE 1

Scale of oxidation damage to tissue established for *D. antarctica* explants cultivated in temporary immersion bioreactors.

| Scale Value | Description of damage |
|---|---|
| Degree 0 | Explants with no damage. |
| Degree 1 | Explants with 25% of biomass oxidized or dead. |
| Degree 2 | Explants with 25% to 50% of biomass oxidized or dead. |
| Degree 3 | Explants with 51% to 75% of biomass oxidized or dead. |
| Degree 4 | Explants with 76% to 100% of biomass oxidized or dead. |

The degree of oxidation was calculated using the Townsend and Neuberger formula (1943), which considers the frequency and intensity with which the explant damage occurs, using the equation:

$$P = \left[\sum \frac{(n \times v)}{CM \times N}\right] \times 10 \qquad \text{Equation 1}$$

Where:
P=weighted degree of severity of oxidation
n=number of explants for each category in the scale
v=numerical value of each category
CM=largest category
N=total number of explants in the sample The percentage of explants oxidized in treatment was also calculated, using the equation:

$$\%O = \left(\frac{EO}{ET}\right) \times 100 \qquad \text{Equation 2}$$

Where:
% O=percentage of explants oxidized in each treatment
EO=number of oxidized explants in the sample
ET=total number of explants evaluated in the sample To determine the average increase in fresh weight (IFW) in each treatment, the initial weight of the inoculated explants in each bioreactor was taken (including an experimental unit) and then averaged. The fresh weight data was collected at the end of each repetition in each treatment. The increase in fresh weight was calculated using the equation:

$$IFW = FW_f - FW_o \qquad \text{Equation 3}$$

Where:
IFW=average fresh weight increase in each treatment
$FW_f$=average final fresh weight of the biomass in each treatment
$FW_o$=average initial fresh weight of the biomass in each treatment To determine the average fresh weight increase per explant (IFWe) for each treatment, each explant was measured at the beginning and end of the test for each repetition, and the averages were calculated. The fresh weight increase was calculated using the equation:

$$IFW_e = FW_{ef} - FW_{eo} \qquad \text{Equation 4}$$

Where:
$IFW_e$=average fresh weight increase per explant
$FW_{ef}$=average final fresh weight of the biomass in each bioreactor
$FW_{eo}$=average initial fresh weight of the biomass in each bioreactor.

The reproduction rate variable was calculated considering the average number of shoots seen in a random sampling of 10 explants in each treatment repetition, using the equation:

$$TM = \frac{NTB}{TEM} \qquad \text{Equation 5}$$

Where:
TM=reproduction rate
NTB=total number of shoots counted among the explant samples. Any new tiller with differentiated, pigmented leaves was considered a shoot.
TEM: total explants sampled
Results: Osmotic Regulation The use of osmoregulating agents significantly affected the behavior of *D. antarctica* in the bioreactors. The survival variable showed that the three concentrations of sodium chloride studied significantly affected the survival of the explants and that a higher concentration of this salt increased the death rate. The phytotoxic effects of increasing sodium chloride concentrations from $gL^{-1}$ to 20 $gL^{-1}$ were seen in the explants' rapid chlorosis and low biomass development. These results coincide with those documented by (Ruhland and Krna, 2010), who found that a high concentration of salts in the substratum affected the growth and development of the *D. antarctica*'s roots.

In tissue cultures in general, it has been seen that an increase in the concentration of sodium ions in the medium hampers the absorption of nutrients, while sodium chloride affects the cell's osmotic potential and absorption of water from the base medium (Chakrabarty et al., 2003; Ziv and Lilien-Kipnis, 2000).

Figure 3:
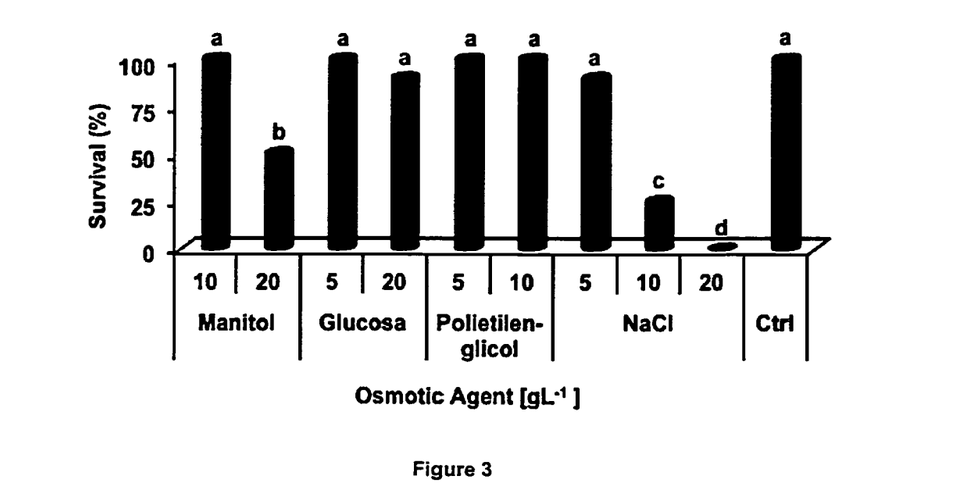
FIG. 3.—Survival of *D. antarctica* in bioreactor cultures with osmoregulating compounds. Values with different letters differ statistically from each other ($p \leq 0.05$).

In contrast, the use of glucose (5 $gL^{-1}$), PEG (10 $gL^{-1}$; 20 $gL^{-1}$), and mannitol (10 $gL^{-1}$ and 20 $gL^{1}$) produced survival levels that were similar to the control (FIG. 3). However, increasing the glucose concentration to 20 gL-1 reduced the explants' survival rate by up to 50%, probably due to reduced hydric potential in the culture medium and, as a result, plasmolysis of the *D. antarctica* cells under these conditions.

In general, the degree of oxidation depended on the toxicity of the osmoregulating agent. The control treatment was the only one where tissue oxidation did not occur, while the percentages of oxidation varied from 40% to 100% depending on the treatment. However, the degree of oxidation in treatments with glucose, mannitol, and PEG were distributed primarily in degree 1 of the scale, so the intensity of oxidation was generally low, which indicates that the explants can develop a good morphogenic response under these conditions.

Figure 4:
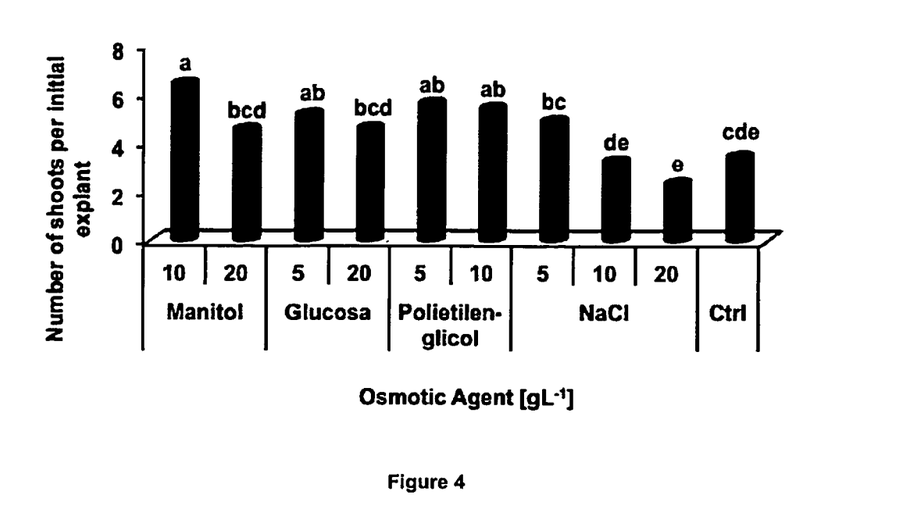
FIG. 4.—*D. antarctica*'s reproduction rate in bioreactors, with osmoregulating compounds. Values with different letters differ statistically from each other (p<0.05).

The morphogenic response, expressed through the reproduction rate, was greatest in the treatment supplemented with glucose at 5 $gL^{-1}$, followed by the treatments with mannitol (5 $gL^{-1}$) and both PEG treatments (5 $gL^{-1}$ and 20 $gL^{-1}$). Although these treatments had different values, there were no significant differences between them, but they were statistically different from the control treatment (FIG. 4). This response can be explained by these organic compounds' being incorporated into the plant's metabolism as a source of immediately metabolizable energy instead of saccharose, which has to be transformed first (Ziv and Lilien-Kipnis, 2000).

The osmoregulating effect of saccharose, mannitol, and PEG can also help water and nutrients enter the cell in an orderly way, responding to changes in the cell's hydric potential or the active flow of these nutrients. In that case, the cell would be protected from the massive flow of water and excessive turgescence, a response that decreases the explants' hyperhydricity and therefore improves its organogenic capacity.

Figure 5:
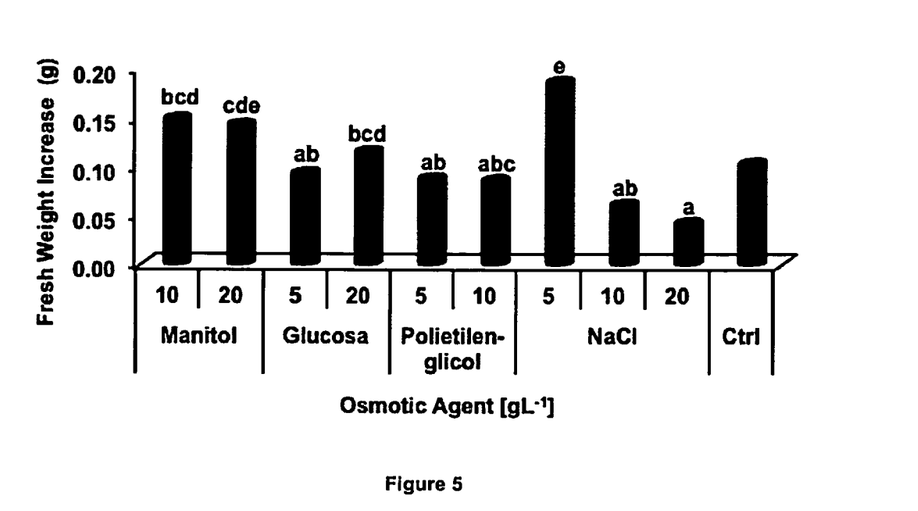
FIG. 5.—Fresh weight increase in *D. antarctica* explants in bioreactors, with osmoregulating compounds. Values with different letters differ statistically from each other (p≤0.05).

Fresh weight increased significantly among the treatments supplemented with glucose (5 $gL^{-1}$ and 20 $gL^{-1}$) and sodium chloride (5 $gL^{-1}$). An increased concentration of sodium chloride significantly affected biomass production, decreasing fresh weight by 60% (FIG. 5), but the treatment that had the greatest difference with respect to the control treatment was the lowest dose of sodium chloride. Increased concentrations of glucose did not significantly affect the explants' growth, probably due to a greater availability of a carbon source to perform metabolic functions (Alberdi et al., 2002). Also, osmotic regulation of these two compounds facilitates the cell's optimization of water intake. In addition, this species grows in extreme environments where regulation of the cell's osmotic potential could be a factor in its response to the low temperatures or to the different types of abiotic stress to which it is exposed, such as stress from wind drying or soil salinity.

Furthermore, the fact that the species responds to stress conditions by producing antioxidant enzymes (Zamora et al., 2010) probably induces a better response to culture conditions in media with high osmotic potential. It has been observed that *D. antarctica* cultures with PEG have a series of enzymatic responses associated with the oxidative response in plants (Zamora et al., 2010).

Given these results, we suggest using glucose at 5 $gL^{-1}$ as an osmoregulating agent for explants cultivated in temporary immersion bioreactors. With this compound, the explants showed a higher reproduction rate, a significant increase in biomass production, and a 100% survival rate.

4.3.—The Effect of Growth Regulators on *D. antarctica*'s Morphogenic Response and Biomass Production The use of growth regulators to improve the morphogenic response and optimize biomass production in plant tissue cultivated in bioreactors has been documented extensively for various species (Stanly et al., 2010).

In order to determine the appropriate composition of growth regulators for explant propagation and to establish the differences in the physical state of the liquid culture medium compared to the semisolid medium, a comparative study was done on the effect of growth regulators on the culture medium using the SIT method and the conventional propagation method, SSS. To determine the growth regulators' effect on *D. antarctica*'s morphogenic response and biomass formation, a study was done on the effect of combining the cytokinin 6-benzylaminopurine (6-BAP) (0.0; 0.5; 1.0; and 3.0 mgL-1) with the auxin indolbutyric acid (AIB) (0.0; 0.1; 0.25; and 0.5 $mgL^{-1}$). Likewise, a study was done of the effect of a set concentration of gibberellic acid (3 mgL-1) combined with the auxins and cytokinins and their isolated effect in the culture medium. Gibberellic acid is associated with the elongation of tissues, and it could play a significant role in biomass growth.

For each bioreactor, 50 to 60 explants with the phenotype characteristics indicated in the osmotic agent test were used in 1000 ml of nutritive medium for each condition, keeping an initial treatment weight of 2 grams. For the SSS method, 25 explants were used in Petri dishes with 40 ml of a medium gelled with agar (Gelzan') at a rate of 2.5 $gL^{-1}$.

A 12-hour immersion frequency was used, with immersion times of 3 minutes and aeration times of 5 minutes.

For this test, the total weight of inoculated biomass was adjusted at 2.0 g per bioreactor. Therefore, the number of plants per bioreactor varied, and the distribution of weight and size during inoculation was random. The experimental unit was the explant.

The effect of the growth regulators was evaluated with the following variables: Increase in fresh weight (FW) per treatment, increase in fresh weight/explant, reproduction rate, survival of explants, and degree of oxidation; all of the same criteria used in the test with osmotic agents.

A sample of 25 explants was taken for each treatment in order to measure the different variables.

Results with Growth Regulators

Figure 6:
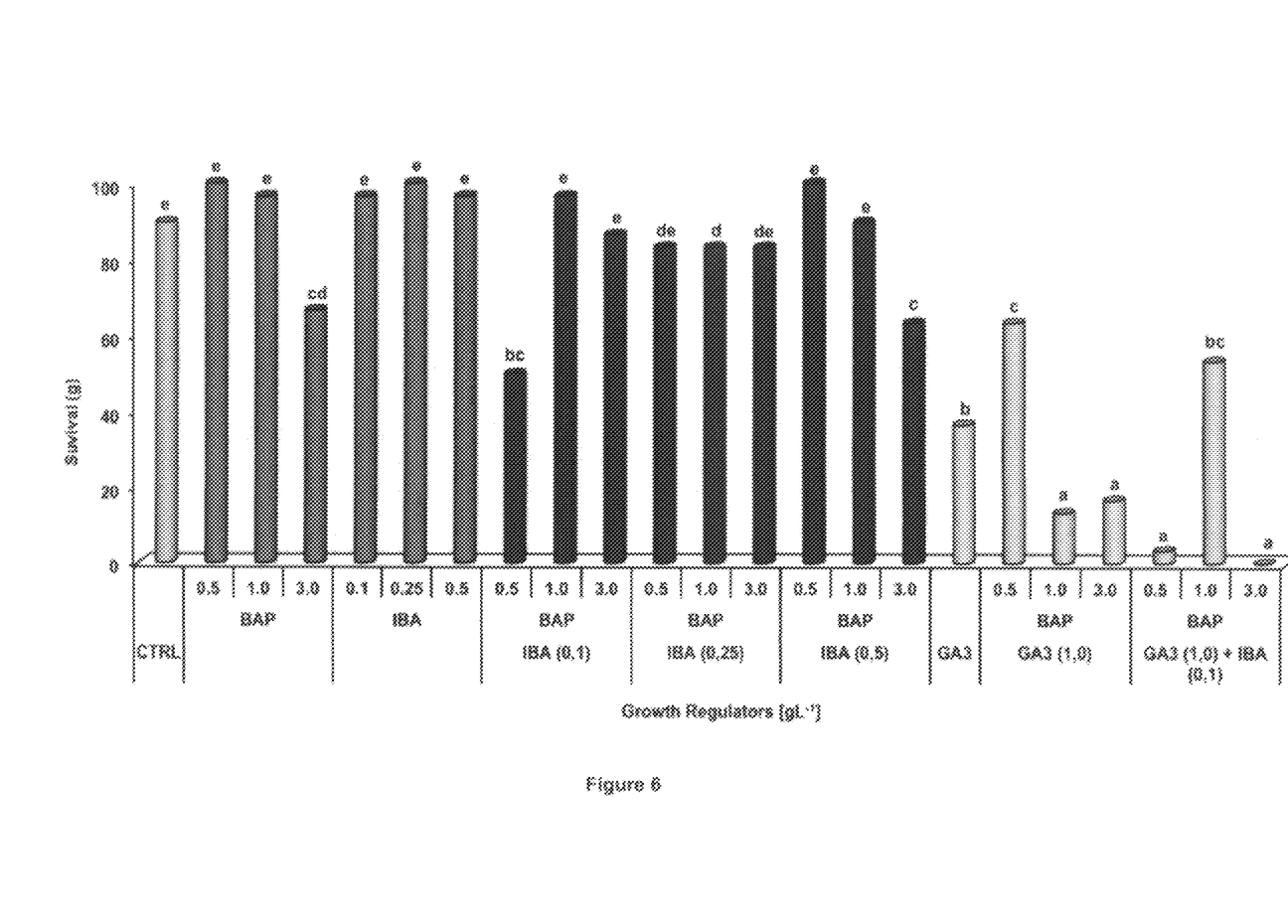
FIG. 6. Survival of *D. antarctica* in bioreactors, with different growth regulators. Values with the same letter do not differ from each other (p≤0.05).

The use of growth regulators to improve *D. antarctica*'s morphogenic response demonstrated a significant influence on the survival of the explants (FIG. 6). In general, the best treatments had a survival rate that fluctuated from 83.33% to 100%. It was observed that high concentrations of BAP combined with GA3 or the presence of only GA3 in the culture medium resulted in survival percentages that were significantly lower than the control treatment and lower than the rest of the treatments with better behavior. It has been observed that GA3 can have an anticytokinin effect in some species and that the tissue may respond with depigmentation in its photosynthetically active areas, which progressively causes death to the explants (Garcia et al., 2010). The best treatments for the survival variable did not differ significantly from the control treatment. Neither the addition of AIB or BAP, nor the combination of these growth regulators, significantly increased the survival of the explants. From a practical point of view, this result would indicate that *D. antarctica* may be rooted in the bioreactor itself and later planted in the ground, if necessary.

Regarding the treatments repeated in a solid medium, the treatments with best results for the survival variable do not show significant differences ($p \geq 0.05$).

Figure 7:
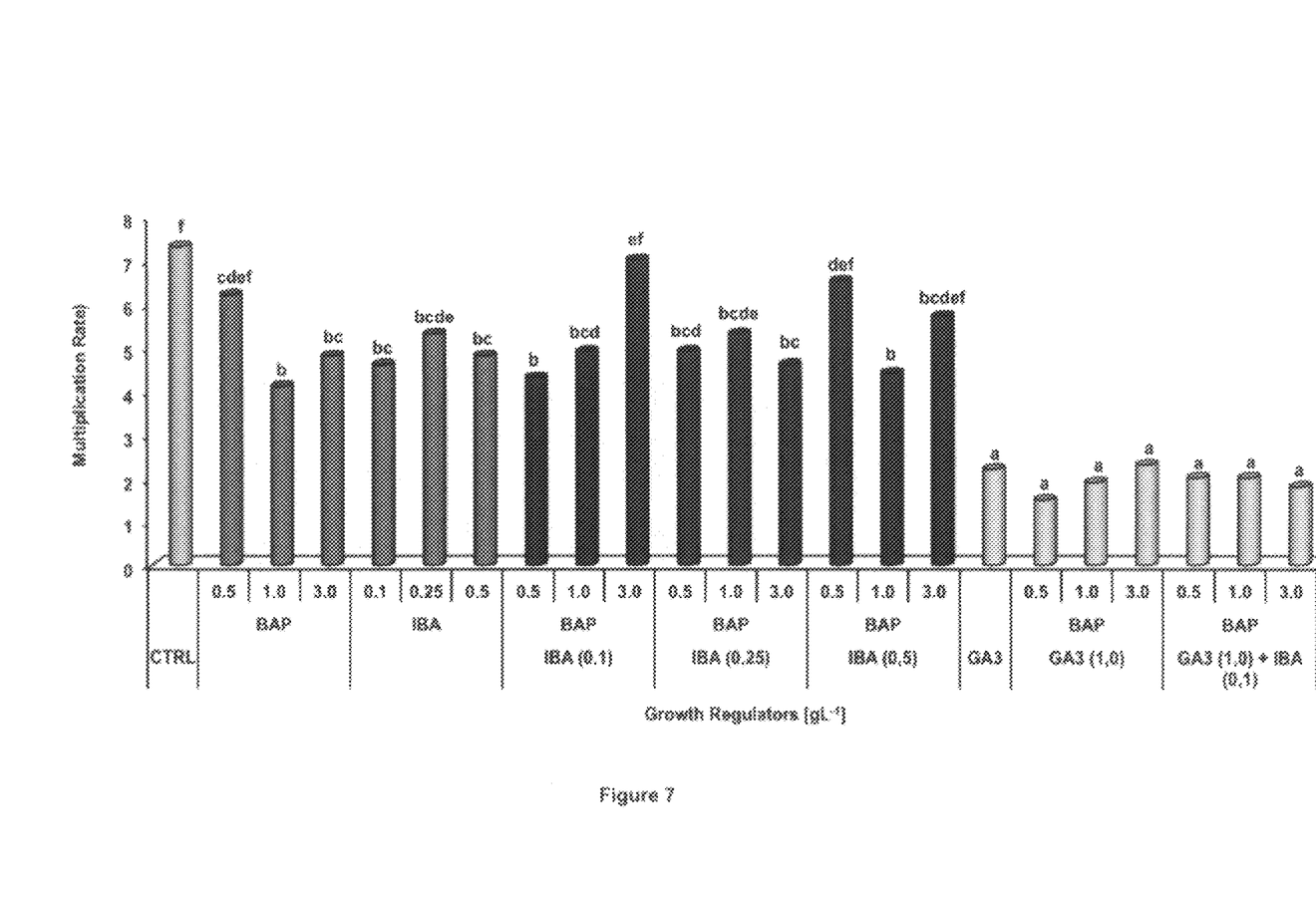
FIG. 7.—Reproduction rate of *D. antarctica* in bioreactors with different growth regulators. Values with the same letter do not differ from each other (p≤0.05).

In the same way, *D. antarctica*'s reproduction rate in the SIT method differed significantly in all the treatments (FIG. 7). The use of BAP was sufficient to induce efficient organogenic responses in the species, which correlates with previous studies done in a solid medium (Cuba et al., 2005). When applied to species cultivated in temporary immersion systems, the cytokinins seem to accelerate cell division and rapid differentiation of tissues, which could explain *D. antarctica*'s better behavior in these experiments (Debnath, 2010).

The presence of GA3 in the culture medium significantly reduced the reproduction rate, while the better treatments did not differ significantly from the control treatment. Adding AIB to the treatments with BAP did not have a significant effect on the reproduction rate, but when auxin is present in the medium at concentrations lower or higher than 0.25 $mgL^{-1}$, the reproduction rate is lower than that of the control. For micropropagation protocols that continue with the adaptation ex vitro, it would be advisable for the treatments to include the use of AIB, as in the case of the following treatments: BAP 0.5 $mgL^{-1}$+AIB 0.5 $mgL^{-1}$; BAP 1 $mgL^{-1}$+AIB 0.25 $mgL^{-1}$; BAP 3 $mgL^{-1}$+AIB 0.1 $mgL^{-1}$+GA3 3 $mgL^{-1}$; and AIB 0.25 $mgL^{-1}$.

Figure 8:
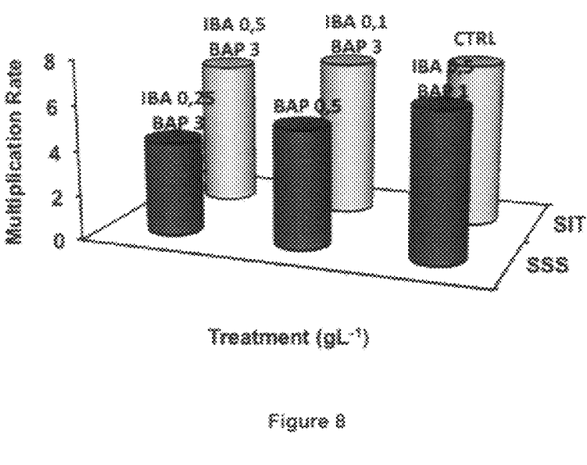
FIG. 8.—Comparison of the best treatments for increasing the reproduction rate between SIT and SSS propagation.

The liquid culture medium significantly improves the morphogenic response of this species, as shown in FIG. 8. A comparison of the best liquid- and solid-culture medium treatments for the Reproduction Rate Variable shows that only one solid treatment reaches values that are statistically similar to the best liquid treatments. Cultures in temporary immersion systems have proven to be most effective for both species C3 and species C4 (Debnath, 2010; Hua et al., 2010; Kämäräinen-Karppinen et al., 2010; Mordocco et al., 2009; Ptak and Gadek, 2009; Scheidt et al., 2009). A study done of *Rodophiala* species showed that the morphogenic response was best in explants cultivated in SIT (Muñoz et al., 2009), even though the explants had a poorer morphophysiology under these conditions.

Figure 9:
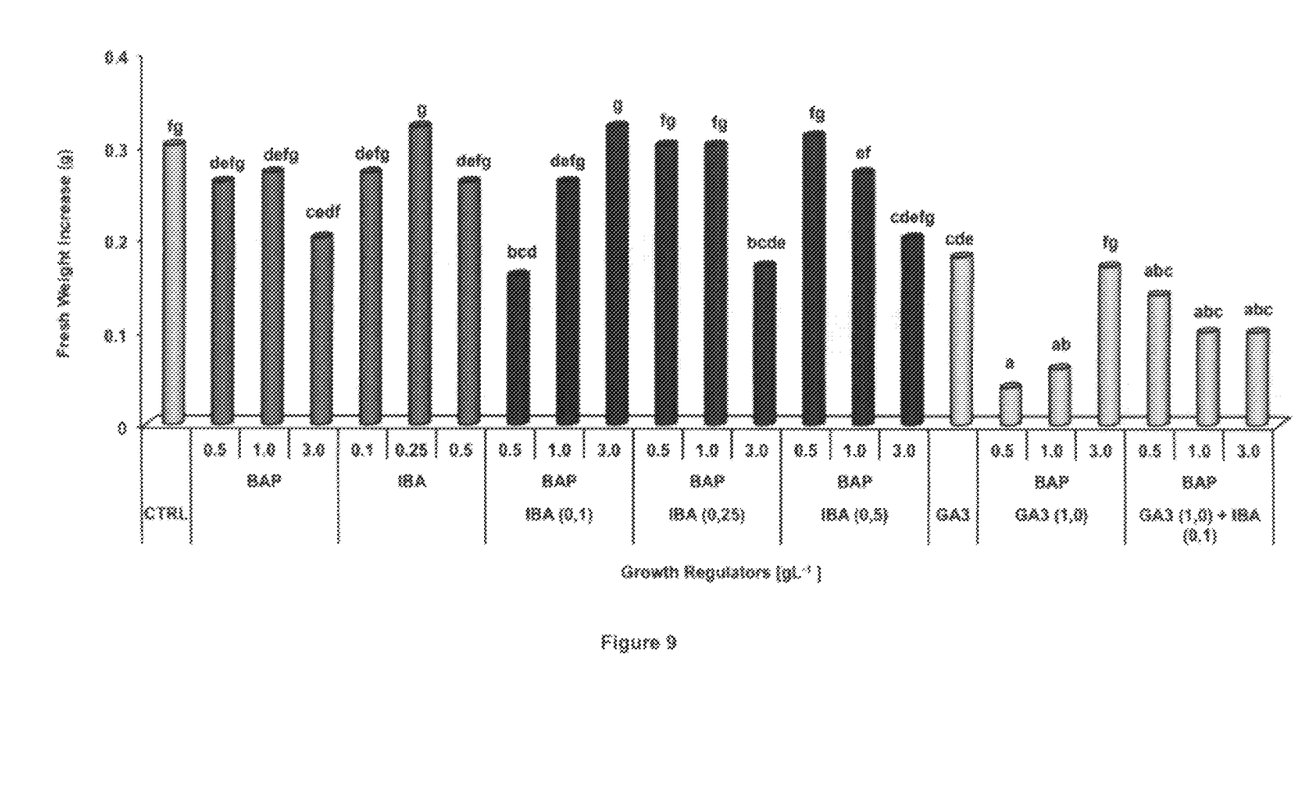
FIG. 9.—Average fresh weight increase in *D. antarctica* explants in bioreactors with different growth regulators. Values with the same letter do not differ from each other (p≤0.05).

Meanwhile, biomass production increased significantly in treatments supplemented with BAP and AIB, as well as in the treatments that combined both growth regulators (FIG. 9). However, treatments with AIB, both in conjunction with BAP and when used alone in the culture medium, induced root formation, which may have affected foliar biomass (this data was not measured). Treatments using BAP alone, or where the cytokinin:auxin ratio favored BAP, induced only shoot formation or the development of aerial biomass. This result is relevant to the objectives for which a protocol is established, since, if the production of metabolites is concentrated in the photosynthetically active areas, the production of roots is a morphogenic event that creates competition for the nutrients and space available inside the bioreactor.

The cytokinin:auxin ratio and the type of cytokinins may determine the quality of the morphogenic response in plant tissue cultivated in temporary immersion bioreactors. In a test done on *C. odorata* it was determined that the natural cytokinins present in coconut water improved shoot generation and quality from nodal segments cultivated in a temporary immersion system (Peña et al., 2010).

Figure 10:
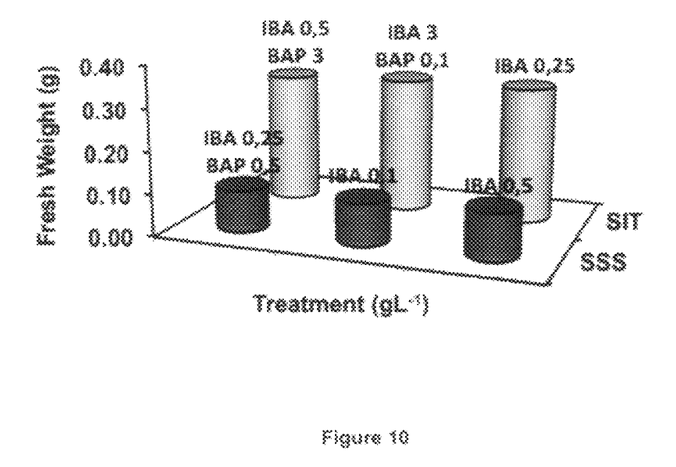
FIG. 10.—Fresh weight increase (g) in *D. antarctica* cultivated in bioreactors (SIT) and semi-solid medium (SSS) with different growth regulators.

Regarding the best solid-medium treatments (FIG. 10), cultures in temporary immersion systems improved biomass production efficiency (it was up to three times higher). Better assimilation of nutrients, as well as more efficient assimilation of carbohydrates, can justify the improved behavior in these systems. It is also possible that competitive pressure for nutrients, space, and air brings on increased biomass production in liquid cultures (Navarro and Vazquez, 2009).

REFERENCES

Alberdi, M., Bravo, L., Gutierrez, A., Gidekel, M., and Corcuera, L. (2002). Ecophysiology of Antarctic vascular plants. Physiol Plant 115, 479-486.

Barcikowski A, Lyzwtnska R, and Zarzycki K (1999). Growth rate and biomass production of *Deschampsia antarctica* Desv. in the Admiralty Bay region. South Shetland Islands Antarctica. Polish Polar Research 20, 301-311.

Bravo, L. A., Ulloa, N., Zuñiga, G. E, Casanova, A., Corcuera, L. J. (2001). Cold resistance in Antarctic angiosperms, Physiologia Plantarum, 111: 55-66.

Bravo, L., and Griffith, M. (2005). Characterization of antifreeze activity in Antarctic plants. J Exp Bot 56, 1189-1196.

Bystrzejewska, G. (2001). Photosynthetic temperature response of Antarctic plant *Deschampsia antarctica* and of temperate region plant *Deschampsia coespitosa*. Polish Journal of Ecology 49, nr 3, 215-219.

Corte, A. (1961). *Fertilidad de las semillas fanerógenas que crecen en el Cabo Primavera (Costa de Danco), Península Antártica*. Contr Inst Antarct Argentino. 65, 1-16.

Cuba, M., Gutierrez, A., Butendieck, B., and Gidekel, M. (2005). Micropropagation of *Deschampsia antarctica*—a frost-resistant Antarctic plant. Antarctic Science 17, 69-70.

Chakrabarty, D., Hahn, E., Yoon, Y., and Paek, K. (2003). Micropropagation of apple rootstock M.9 EMLA using bioreactor. Journal of horticultural science & biotechnology 78, 605-609.

Day, T., Ruhland, C., and Xiong, F. (2001). Influence of solar ultraviolet-B radiation on Antarctic terrestrial plants: results from a 4-year field study. J Photochem Photobiol B 62, 78-87.

Debergh, P. C., and Maene, L. J. (1981). A scheme for commercial propagation of ornamental plants by tissue culture. Scientia Horticulturae 14, 335-345.

Debnath, S. (2010). A Scaled-Up System for In Vitro Multiplication of Thidiazuron-Induced Red Raspberry Shoots Using a Bioreactor. Journal Of Horticultural Science & Biotechnology 85, 94-100.

Etienne, H., and Berthouly, M. (2002). Temporary immersion systems in plant micropropagation. Plant Cell, Tissue and Organ Culture 69, 215-231.

Holderegger, R., Stehlik, I., Smith, L., and Abbott, R. J. (2003). Populations of Antarctic hairgrass (*Deschampsia antarctica*) show low genetic diversity. Arctic Antarctic and Alpine Research 35, 214-217.

Hua, Y., Huang, T., and Huang, H. (2010). Micropropagation of self-rooting juvenile clones by secondary somatic embryogenesis in *Hevea brasiliensis*. Plant Breeding 129, 202-207.

Kämäräinen-Karppinen, T., Virtanen, E., Rokka, V. M., and Pirttilä, A. (2010). Novel bioreactor technology for mass propagation of potato microtubers. Plant Cell, Tissue and Organ Culture 101, 245-249.

Lewis Smith, A. R. (2003). The enigma of *Colobanthus quitensis* and *Deschampsia antarctica* in Antarctica. In: Huickes A H I, Gieskes W W C, Schorno R L M, van der Vies S M, Volff W I. Antarctic biology in a global context, 234-239.

Mordocco, A., Brumbley, J., and Lakshmanan, P. (2009). Development of a temporary immersion system (RITA®) for mass production of sugarcane (<i>Saccharum</i> spp. interspecific hybrids). In Vitro Cellular & Developmental Biology—Plant 45, 450-457.

Muñoz, M., Seemann, P., Jara, G., and Riegel, R. (2009). Influence of Vessel Type, Physical State of Medium and Temporary Immersion on the Micropropagation ff Three *Rhodophiala* Species. Chilean Journal of Agricultural Research 69, 581-587.

Murashige, T. (1973). Nutrition of plant cells and organs in vitro. In Vitro 9, 81-85.

Navarro, C., and Vazquez, R. (2009). The Utilization of Temporary Immersion System (Rita) to Enhance Initial Steps in Commercial Micropropagation of *Cordyline* Spp. In Vitro Cellular & Developmental Biology-Animal 45, 26-26.

Peña, Y., Juárez, J., Gómez, L., Jerónimo, J., Garcia, I., González, J., and Robert, M. (2010). Multiple adventitious shoot formation in Spanish Red Cedar (<i>Cedrela odorata</i> L.) cultured <i>in vitro</i> using juvenile and mature tissues: an improved micropropagation protocol for a highly valuable tropical tree species. In Vitro Cellular & Developmental Biology—Plant 46, 149-160.

Ptak, A., and Gadek, J. (2009). Micropropagation of *Leucojum Aestivum* in a Temporary Immersion Bioreactor System (Rita). Acta Biologica Cracoviensia Series Botanica 51, 60-60.

Roberts, A. V., and Matthews, D. (1995). The preparation in vitro of *chrysanthemum* for transplantation to soil. Plant Cell, Tissue and Organ Culture 40, 191-193.

Ruhland, C., and Krna, M. (2010). Effects of salinity and temperature on *Deschampsia antarctica*. Polar Biology 33, 1007-1012.

Ruhland, C. T., and Day, T. A. (2001). Size and longevity of seed banks in Antarctica and the influence of ultraviolet-B radiation on survivorship, growth and pigment concentrations of *Colobanthus quitensis* seedlings. Environ Exp Bot 45, 143-154.

Scheidt, G., Arakaki, A., Chimilovski, J., Portella, A., Spier, M., Woiciechowski, A., Biasi, L., and Soccol, C. (2009). Utilization of the Bioreactor of Immersion by Bubbles at the Micropropagation of *Ananas comosus* L. Merril. Brazilian Archives Of Biology And Technology 52, 37-43.

Stanly, C., Bhatt, A., and Keng, C. (2010). A Comparative Study of *Curcuma Zedoaria* And *Zingiber Zerumbet* Plantlet Production Using Different Micropropagation Systems. African Journal of Biotechnology 9, 4326-4333.

Tisserat, B., and Vandercook, C. (1986). Computerized long-term tissue culture for orchids. American Orchid Society bulletin 55, 35-42.

Townsend, G., and Neuberger, J. (1943). Methods for Estimating Losses Caused by Diseases in Fungicide Experiments. Plant Disease 27, 340-343.

Xiong, F., Ruhland, C., and Day, T. (1999). Photosynthetic temperature response of the Antarctic vascular plants *Colobanthus quitensis* and *Deschampsia antarctica*. Physiologia Plantarum 106, 276-286.

Zamora, P., Rasmussen, S., Pardo, A., Prieto, H., and Zuniga, G. (2010). Antioxidant Responses of In Vitro Shoots of *Deschampsia Antarctica* to Polyethylene Glycol Treatment Antarctic Science 22, 163-169.

Ziv, M. (2005). Simple bioreactors for mass propagation of plants. Plant Cell, Tissue and Organ Culture 81, 277-285.

Ziv, M., and Lilien-Kipnis, H. (2000). Bud regeneration from inflorescence explants for rapid propagation of geophytes in vitro. Plant Cell Reports 19, 845-850.

Zuñiga, G., Alberdi, M., and Corcuera, L. (1996). Non-structural carbohydrates in *Deschampsia antarctica* Desv. from South Shetland Islands, Maritime Antarctic. Environmental and Experimental Botany 36, 393-398.

The invention claimed is:

1. A process for producing *D. antarctica* explants at a high survival rate comprising the steps of
   (a) preparing explants in a suitable nutritive growth medium,
   (b) immersing the explants in a liquid culture medium at a specified immersion frequency,
   (c) aerating the explants after immersion for a specified period of time, and,
   (d) repeating steps (b) and (c) to achieve a desired level of production.

2. High-quality *D. antarctica* explants prepared in accordance with the process of claim 1.

3. The process of claim 1 wherein the *D. antarctica* explants are immersed in the culture medium at an immersion frequency of 1, 2 or 4 times per day.

4. The process of claim 1 wherein the *D. antarctica* explants are immersed in the culture medium at an immersion frequency of 2 times per day producing explants having a survival rate of about 80%.

5. The process of claim 1 wherein the growth medium is a semi-solid or a solid growth medium.

6. The process of claim 1 wherein the liquid culture medium is supplemented with growth regulators comprising BAP and AIB.

* * * * *